United States Patent Office 3,515,431
Patented June 2, 1970

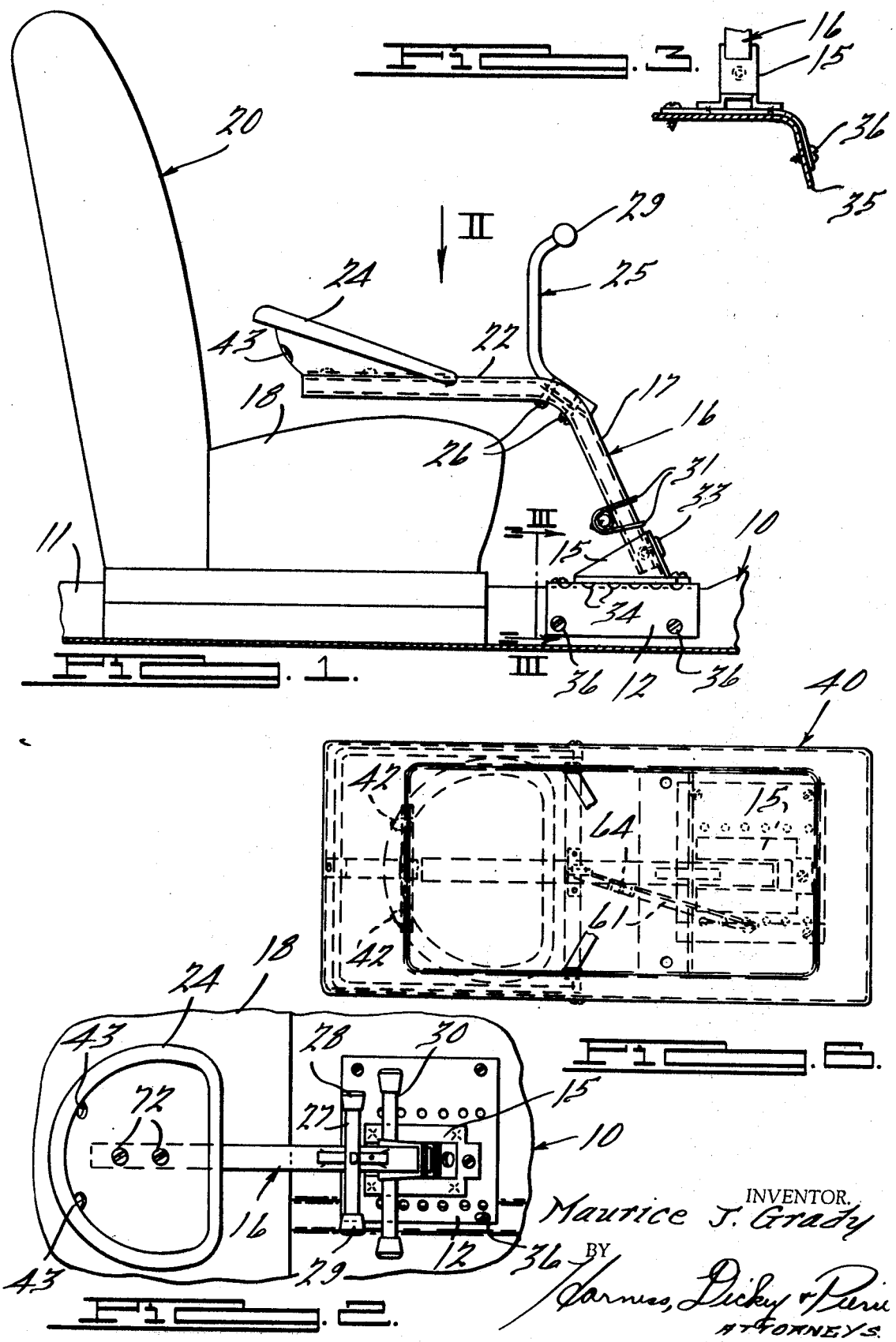

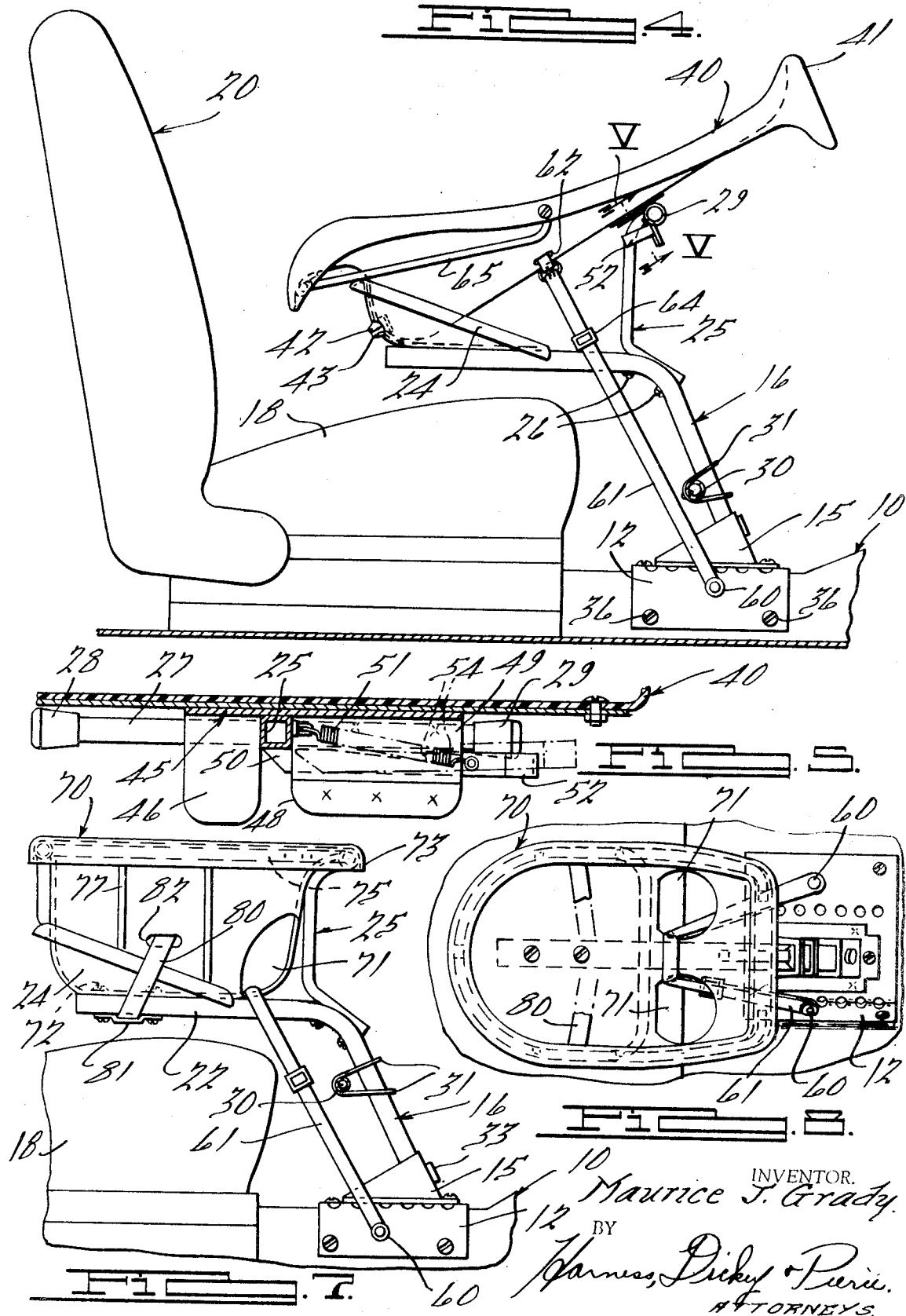

3,515,431
VEHICLE SEAT FOR CHILDREN
Maurice J. Grady, 1829 Sycamore,
Royal Oak, Mich. 48073
Filed Apr. 29, 1968, Ser. No. 724,739
Int. Cl. B60n 1/12
U.S. Cl. 297—250                    7 Claims

ABSTRACT OF THE DISCLOSURE

A seat construction for children and which designed to be installed in automotive vehicles is carried by a socketed anchor installed on the floor in front of a regular seat of the vehicle and has a removable tubular support which extends upwardly in front of and then rearwardly over the cushion of the main seat and where it carries a dished saddle-type seat for use by children old enough to sit erect. A rigid handlebar is carried by the support in front of the seat, the saddle and the handlebar being positioned and constructed to receive and support supplemental carriers for smaller children. Releasable holding means are provided coacting with portions of the saddle and handlebar structure for supplemental seat structures by which smaller children who have not attained the age for sitting erect without supplemental support will be confined, protected and supported. Safety straps are provided for anchoring the seating means and children occupying the same.

The purpose of this abstract is to enable the Patent Office and the public generally and especially the scientist, engineer or practitioner in th eart who is not familar with patent or legal terms or phraseology to determine quickly from a cursory inspection the nature and essence of the technical disclosure of the application. The abstract is neither intended to define the invention of the application, which of course is measured by the claims, nor is it intended to be limiting as to the scope of the invention in any way.

---

This invention is an improvement upon the construction disclosed in my previous U.S. Pats. No. 2,886,093, granted May 12, 1959 and No. 3,088,704, granted May 7, 1963, relates particularly to a new and improved auxiliary seat intended for use by children when riding in motor vehicles or boats.

An important object of the invention is to provide an improved automobile seat for children, consisting of a basic unit to serve children from approximately age two to eight or ten, but which can also be used to carry in safety a tiny infant until approximately six months old, by the simple addition of a portable plastic cradle. After the child is able to sit up alone, the portable cradle is replaced by an intermediate plastic crib which will contain the child in safety until able to ride the basic unit which is about at the two year stage.

A further object of the invention is to provide an inexpensive automobile seat for children which lends itself to installation in any of five different locations in an automobile, in all of which locations the child, regardless of age, is riding in close proximity to stationary parts of the automobile (which can be padded) so that in case of a sudden stop or accident the child cannot be thrown any distance to gain momentum.

A further object is to provide such a seat which not only is safer but also is attractive to children because it is comfortable, affords the child and adult's view from the car, gives the child a feeling of having a seat of its own.

A further object is to provide such a seat which does not detract from the adult seating space.

Still another object is to provide such a seat which is easily displaced, which can be inserted or removed from its anchor plate without tilting or reaching down to the floor to unlatch, which can be used on the right front portion of the car regardless of the overhang of the cowl, and which when so installed places the child's chest close to the padded cowl.

Still another object is to provide a seat which lends itself to be supplemented by a safety belt if desired.

Still another object is to provide an improved handlebar and adjustable foot rest arrangement which helps the child balance himself on sudden stops or turns.

Still another object is to provide a light, compact assembly which can be handled with ease and can be stored in the trunk when not needed.

Another object is an improved anchor plate which is versatile in its adaptability to be formed and installed in many shapes to fit the contour of the floor.

Another object is to provide an improved seat which is entirely supported from the floor allowing the driver's seat to be adjusted in any direction without affecting the child passengers.

Still another object is to provide an improved car carrier for small infants which permits handling and transporting a baby from house to car in a portable cradle which rests upon the basic seat and automatically latches in place, leaving the baby facing the driver and out of the way of both the driver and passenger in the right front seat.

Another object is the provision of such an improved seat having an absence of movable parts on which a child could pinch its fingers.

Still another object is the provision of an improved basic seat on the indicated character designed to receive and restrain a portable crib which will hold a toddler until they are old enough to ride the basic seat.

Other advantages will become apparent upon consideration of the present disclosure in its entirety.

In the drawing:

FIG. 1 is a side elevational view of a child's vehicle seat constructed in accordance with the present invention showing the same installed in and illustrating adjoining parts of the interior of a motor vehicle;

FIG. 2 is a plan view of the installed seat;

FIG. 3 is a sectional detail taken substantially on the line III—III of FIG. 1 and looking in the direction of the arrows;

FIG. 4 is a view similar to FIG. 1, showing a supplemental infant carrier installed on the seat;

FIG. 5 is a sectional detail taken substantially on the line V—V of FIG. 4 and looking in the direction of the arrows;

FIG. 6 is a plan view taken substantially as indicated by the line and arrows VI—VI of FIG. 4; and FIG. 7 is a side elevational view similar to FIGS. 1 and 4, showing my improved seat equipped with another accessory device which provides improved protective seating for small children of an intermediate age.

FIG. 8 is a plan view of the FIG. 7 device.

Referring now to the drawing, reference character 10 designates the upwardly embossed central floor area of the front compartment of a conventional passenger automobile, which area is commonly referred to as the dog house and formed as a continuation of the rearwardly extending drive shaft tunnel 11.

My improved seat is adapted to be supported by an anchor plate generally designated 12 which may be basically similar to the anchor plate constructions disclosed in my aforementioned patents, but provided with a fixedly attached socket section 15 adapted to slidably and removably receive the straight lower extremity of an angular cantilever main seat support or stand member 16 formed of square-section metal tubing. The lower or riser portion 17 of the seat support extends angularly upwardly and rearwardly to a height such that its rearwardly extending substantially horizontal upper portion 22 is adapted to spacedly overlie the seat cushion 18 of a vehicle seat 20. The upper portion 22 of the support carries at its rear end a dished sheet metal saddle-like seat 24 positioned to conveniently carry a child in such manner that his legs may extend down comfortably in front of the seat cushion and rest upon a footrest 30 carried by riser section 17.

The seat support is releasably secured to the socket section 15 by a snap fastener 33 which is projectible through and resiliently retains itself in position in aligned apertures in the socket portion and upright when the latter is installed in the socket and which can be pulled out to release the support for removal.

The anchor plate 12 is initially flat but with a plurality of orifices which define weakened lines to facilitate bending the same to fit the dog house, propeller shaft tunnel, or other non-planar surface, and may be secured to the sheet metal vehicle floor 35 as by the anchoring screws 36.

A generally T-shaped handlebar assembly extends upwardly in front of the seat to a convenient height, its upright portion 25 being formed of squared tubing and secured by screws 26 to the seat support at the juncture of the upright and horizontal portions 17–22 and having at its top a transverse tubular bar portion 27 and hand grip portions 28, 29. The footrest 30 is also a metal tube and adjustably secured to upright section 17 by means of a U-shaped sheet metal bracket structure 31 of the spring-cramping type releasable by squeezing together its upper and lower portions to permit vertical adjustment of the footrest.

It will be appreciated that a child old enough to sit erect in the seat 24 can ride comfortably seated therein, holding the handlebar 27 and with the feet resting on the footrest 30. The position of the seat 24 when installed in the manner illustrated in FIG. 1 is such that a regular seat belt, installed as for a passenger in the main seat 20, can easily be passed around the child's lap so that he will be retained in the same manner as if riding in the main seat. It will also be appreciated that if desired the handlebar assembly may be provided with a strong but heavily padded transverse protector presented toward the chest of the child.

In order to permit carrying an infant who is too small to sit up unaided, I provide an infant carrier 40, which is of the known basket-seat type, which may be formed of "Fiberglas" or other strong sheet-like material, and which is adapted to be firmly but removably secured in the generally slanted, partially reclining position in which such carriers are normally used, so that a baby may recline with its feet overhanging the rear lower portion of the carrier and its head at the higher forward portion. The infant is thus directly visible to the other occupants of the vehicle but restrained against forward movement by the upwardly extending forward section 41 of the carrier.

On the outer surface of its lower end the carrier is provided with a pair of integral knob portions 42 which are adapted to project through correspondingly positioned holes 43 in the rear wall of the main seat 24. The bottom surface of the carrier nearer its head end is provided with a latch assembly which is adapted to rigidly secure the carrier to the sloping upper extremity of section 25 of the handlebar assembly directly below the crossbar portion 27. As best shown in FIG. 5 the latch assembly includes a sheet metal bracket structure 45 provided with a pair of integral abutment flange portions 46, 48 laterally spaced from each other a distance slightly exceeding the transverse dimension of and adapted to project downwardly on either side of the handlebar riser portion 25 in a position close to crossbar 27. The righthand abutment flange 48 is also a support for a transversely slidable latch bolt 50 housed between flange 48 and a welded-on double bent housing plate 49. A tension spring 51 urges the bolt to a projected position to underlie the bar 25 when the carrier is resting on top of the handlebar as shown. The latch bolt extends close to the right handgrip 29 and has at its end a finger portion 52 by which it may be pulled back to retract the bolt. Bolt 50 is a sheet or strap metal strip, having a shoulder 54 on its upper edge forming the right end of a narrowed section 55 which, when the bolt is withdrawn far enough to pull the abutment free of the bracket, permits the bolt to rise and the shoulder to overengage the housing plate 49 to hold the bolt retracted as shown in broken lines. The spring 51 is installed at an angle such as to tend to urge the bolt upwardly as well as toward the projected position. When the notch 54 is thus over-engaged with the housing plate it prevents reprojection of the latch piece by spring 51 and facilitates removal of the infant carrier. As the upper end of the carrier is lifted to remove it, the bolt rubs against the right-hand grip 29 of the handlebar and is thereby moved downwardly freeing the shoulder 54 from overengagement with housing plate 49, so that the bolt snaps to the projected position and is ready to be automatically relatched in the conventional manner by the camming action of its slanting nose when the infant carrier is next reinstalled in the vehicle. The bottom of the carrier rests on the handlebar, which provides a wide-based support.

On either side of the socket portion 15 the anchor plate 12 is provided with strap anchors 60. A safety step assembly 61 secured at its opposite ends to the anchors 60, extends upwardly and through slots 62 in the side walls of the body of the infant carrier and is adapted to be looped over the occupant to restrain an infant therein. Suitable releasable buckles as 64 may of course be provided, and it will be seen that when these are released and the bolt 50 is withdrawn, the carrier may easily be lifted free. The carrier may in fact be one of the commercial types now available on the market, or constructed similarly thereto, and may be used in the normal manner. It is shown as provided with a swingable bail-type stand 65 permitting it to be supported in inclined position on a floor. The head portion 41 of the carrier preferably not only extends upwardly to protect the child as indicated above, but has a rounded sloping contour so any forward movement is guided upwardly and away from the instrument panel, affording further protection if for any reason the child should not be adequately restrained by the strap. The portion 41 also preferably extends downwardly to provide a convenient arm locating area for a person carrying it.

As shown in FIGS. 7 and 8, the basic seat structure is also adapted, without modification, to support another type of supplemental carrier comprising a tub-type seat for a small child (e.g., six months to two years of age) who does not require the cradling effect of the recliner carrier 40 but is too young to sit erect for long periods without supplement support. The body 70 of the tub-type seat may also be formed of a strong sheet material such as "Fiberglas" or sheet metal, is of a depth substantially corresponding to the height of the handlebar assembly 25 and is provided with front leg holes 71. The front top portion of the tub seat is straight in a transverse direction and such portion together with the entire upper periphery is turned outwardly and downwardly to define a short overhanging skirt 73 the forward portion of which overhangs the crossbar 27 of the handlebar, the handgrip elements 28, 29 of which are removed for installation of the tub seat.

The rear portion of the tub seat fits into and is effectively held against lateral displacement by the main seat 24, and may be removably secured in place by the same screws, 72, which are employed to secure the main seat to the support portion 22, such screws being removed and then reinstalled to extend through aligned holes in both of the seats 70–24.

I preferably provide a reinforcing bail 75 which when the seat is in use fits closely within the downbent rim flange 73. The bail 75 is of heavy wire or bar stock and has oppositively inturned forward ends which are adapted to project into the ends of the cross bar portion 27 of the handle bar assembly. The bail is installed in the handlebar in the indicated manner before the rest of the tub is installed, and body 70 is then moved downwardly into position through the bail. Integral outwardly extending ribs 77 on the vertical walls of the seat body prevent the reinforcing bail 75 from moving downwardly after the seat is installed but do not prevent the seat from being pushed through the bail and downwardly into position as the bail is moved upwardly into the flange, where it is thereafter frictionally held by such ribs, and the seat is then secured by the screws 72 in the manner indicated.

Further security for the child, and supplemental anchoring of the entire structure is provided by the strip 61 which is looped through and across the bottom of the forward portion of the seat via the leg holes 71 to further anchor it to the floor through its attachment to anchors 60. A separate restraining seat belt 80 for the child may be provided which extends under and is located with respect to the seat support portion 22 by bracket 81. The strap 80 extends into the interior of the seat body through slots 82 in the side walls thereof in position to overlie the lap of the occupant. If desired, however, a conventional seat belt of the lap type installed in the vehicle for use by an occupant of the main seat 20, may be employed to restrain the child in the tub seat, in place of the special strap 80. The regular seat belt is thus used by passing it through the slots 82, and affords greater restraining force, although this may not be necessary in view of the relatively light weight of small children occupying such seats.

Inasmuch as the lower extremity of the upright supporting portion 17 of the main support is straight, it may readily be installed in any suitable aperture in a supporting surface, or in a floor stand, for use in a home, boat or other vehicle, or in any desired location.

While it will be apparent that the preferred embodiments of the invention disclosed are well calculated to fulfill the objects above stated, it will be appreciated that the invention is susceptible to modification, varitaion and change without departing from the proper scope or fair meaning of the subjoined claims.

What is claimed is:

1. Seating means, particularly for children, comprising in combination with a stand-type seat support, a seat on the support, and a handlebar rigidly carried by the support in front of the seat in immovable relation to the seat, a carrier for a smaller person, and means for securing said carrier in overlying position on said seat including latch means and releasably intergageable holding portions carried partly by said seat, partly by said carrier and partly by said handlebar.

2. Seating means, particularly for children, comprising in combination with a stand-type seat support, a seat on the support, and a handlebar rigidly carried by the support in front of the seat, a carrier for a smaller person, and releasable means for securing said carrier to both said seat and said handlebar, said handlebar being of T-form, said carrier having a part overlying the top of the handlebar.

3. Means as defined in claim 2 comprising a releasable latch engageable with the handlebar and abutment type holding means interengageable with a portion of the seat.

4. Means as defined in claim 2 wherein said carrier comprises an open topped cradle-like receptacle, means attached to the bottom of the receptacle overengageable with laterally spaced portions of the handlebar, and laterally spaced abutment portions on another portion of said receptacle interengageable with said seat.

5. Means as defined in claim 4 wherein the first mentioned holding means comprises a releasable latch portion interengageable with the handlebar, spring means for projecting said latch portion, holdback means for preventing projection of said latch portion, and means responsive to movement of the receptacle with respect to the handlebar for releasing said holdback means.

6. Means as defined in claim 1 wherein said carrier comprises a bucket-type seat overlying and secured to both said first mentioned seat and said handlebar, and common means securing both of said seats to the support.

7. In combination with means as defined in claim 5, reinforcing means comprising a bail encircling an upper portion of the second mentioned seat and secured at opposite ends to said handlebar.

References Cited

UNITED STATES PATENTS

| | | | |
|---|---|---|---|
| 460,031 | 9/1891 | Rastetter et al. | 297—243 |
| 1,217,474 | 2/1917 | MacGowan | 5—94 |
| 1,567,285 | 12/1925 | Mitchell | 5—94 |
| 2,653,330 | 9/1953 | Nolan | 5—94 |
| 2,886,093 | 5/1959 | Grady | 297—243 X |
| 2,973,889 | 3/1961 | Philips. | |
| 3,088,704 | 5/1963 | Grady | 297—243 X |
| 3,206,247 | 9/1965 | Johnson | 297—254 |
| 3,207,552 | 9/1965 | Loughney | 297—250 |
| 3,351,380 | 11/1967 | Sprague | 5—94 |
| 3,409,325 | 11/1968 | Hamilton et al. | 297—377 |

FRANCIS K. ZUGEL, Primary Examiner

U.S. Cl. X.R.

5—94; 297—243